E. I. GUDELJ.
COMBINED BABY CARRIAGE AND WALKER.
APPLICATION FILED DEC. 6, 1919.
1,381,415.
Patented June 14, 1921.
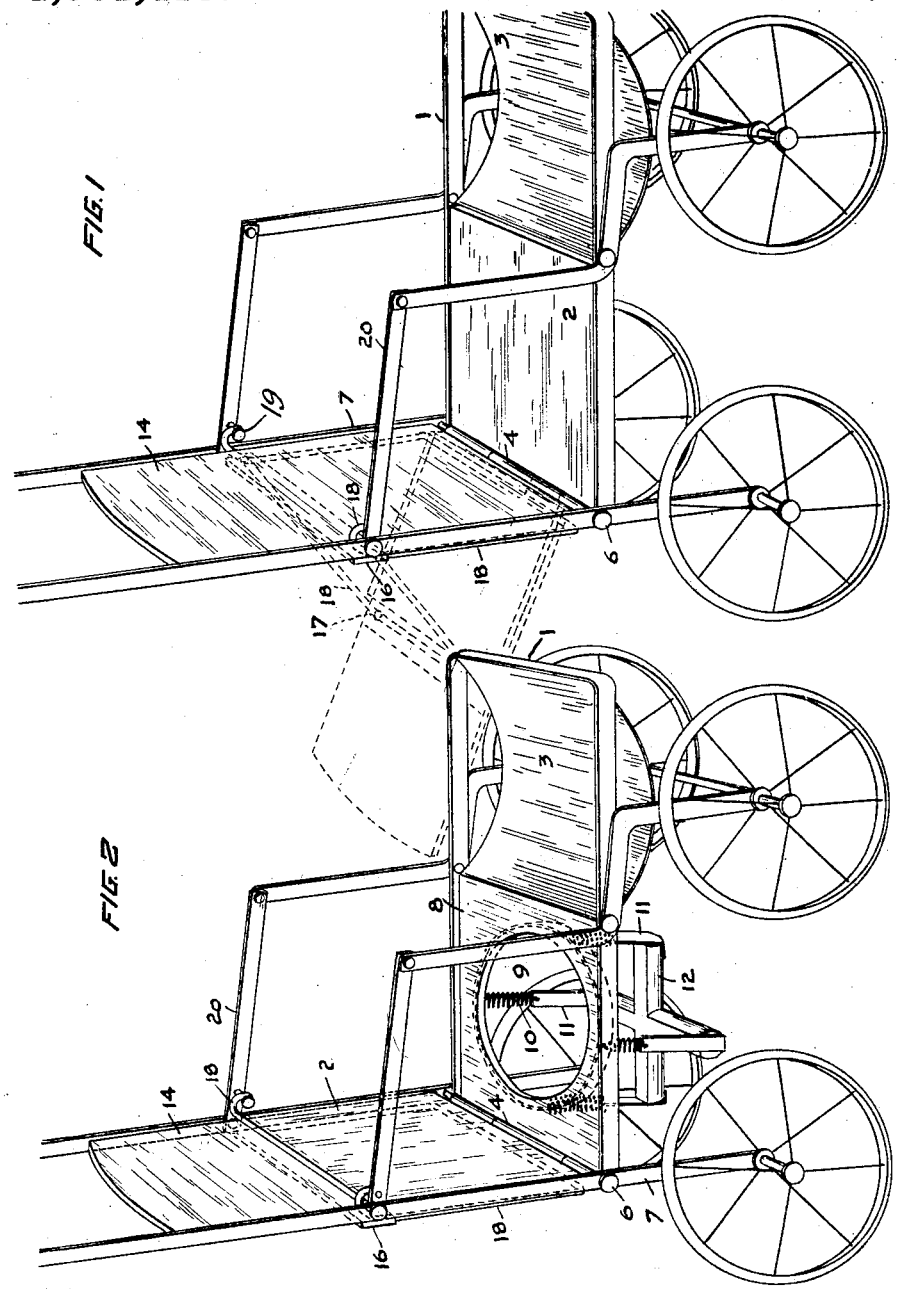
INVENTOR
E. I. GUDELJ

UNITED STATES PATENT OFFICE.

ELLA I. GUDELJ, OF SAN FRANCISCO, CALIFORNIA.

COMBINED BABY CARRIAGE AND WALKER.

1,381,415. Specification of Letters Patent. Patented June 14, 1921.

Application filed December 6, 1919. Serial No. 342,879.

*To all whom it may concern:*

Be it known that I, ELLA I. GUDELJ, a citizen of the United States, residing at San Francisco, in the county of San Francisco and State of California, have invented new and useful Improvements in Combined Baby Carriages and Walkers, of which the following is a specification.

The object of the present invention is to provide a combined baby walker and carriage, which can readily be converted from one to the other.

In the accompanying drawing, Figure 1 is a broken perspective view of my invention used as a baby carriage; Fig. 2 is a similar view of the same used as a baby walker.

Referring to the drawing, 1 indicates a frame of the baby carriage or baby walker, here shown as collapsible, although not necessarily so. It is provided with a seat 2 and an extension 3 of flexible sheet material to support the legs of the baby, said sheet 2 being hinged, as shown at 4, to a transverse rod 6 extending through the rear side posts 7 of the frame, so that said seat 2 can fold backward and upward on said rod 6. When folded backwardly and upwardly on said rod, it uncovers a sheet 8 of thin rigid material having a central round hole 9 of sufficiently large diameter to receive therein a baby, from the margin of which hole depend coiled springs 10, from the lower end of which extend hangers 11 to which are attached the ends of a cross-piece 12. One member of said cross-piece is adapted to pass between the baby's legs and the other members of the cross-piece supporting the baby and preventing it from falling, this likewise being prevented by the fit of the baby's body in the round hole 9. The back 14 of the baby carriage can be moved from a stationary upright position, as shown in solid lines, for supporting the baby in a sitting position, to an inclined position, as shown in dotted lines for supporting the baby in a sleeping position, being there supported by a rail 16 secured to said back, through holes 17 in the ends of which extends a yoke 18, the ends of said yoke being pivotally secured, as shown at 19, to side arms 20 of the baby carriage. When the back is swung into an upright position, the yoke slides through said holes and hangs downward behind the back.

The seat is horizontal when the device is used as a baby carriage, and, when the device is used as a baby walker, the seat is swung back into an upright position exposing said hole, as shown in Fig. 2.

I claim:—

A combined baby carriage and walker comprising a frame supported on wheels and having a hole therein of sufficient size to receive a baby, means suspended from said frame for suspending a baby from the margin of said hole, with the feet of the baby in position to contact with the ground and the head and shoulders of the baby above said frame, a seat hinged to the frame so as to swing from a horizontal position covering said hole and providing a seat, to a position uncovering said hole so that access to the said means is provided and a seat back hingedly connected to the frame and adapted for supporting the seat in its raised position.

ELLA I. GUDELJ.